(12) United States Patent
Dunbar, Jr.

(10) Patent No.: US 7,414,702 B1
(45) Date of Patent: Aug. 19, 2008

(54) REVERSE LOGIC OPTICAL ACQUISITION SYSTEM AND METHOD

(75) Inventor: Donal S. Dunbar, Jr., Wichita Falls, TX (US)

(73) Assignee: AdTech, Inc., Schertz, TX (US)

( * ) Notice: Subject to any disclaimer, the term of this patent is extended or adjusted under 35 U.S.C. 154(b) by 0 days.

(21) Appl. No.: 11/445,051

(22) Filed: Jun. 1, 2006

(51) Int. Cl.
*G01C 3/08* (2006.01)

(52) U.S. Cl. .................. 356/4.01; 356/3.01; 356/335; 356/614; 356/432; 356/433

(58) Field of Classification Search .............. 356/28, 356/3.13, 4.01
See application file for complete search history.

(56) References Cited

U.S. PATENT DOCUMENTS

| | | | | |
|---|---|---|---|---|
| 4,652,122 A | * | 3/1987 | Zincone et al. | 356/28.5 |
| 5,784,654 A | * | 7/1998 | Saito et al. | 396/104 |
| 6,157,756 A | * | 12/2000 | Ishiwata | 385/31 |
| 6,459,483 B1 | * | 10/2002 | Shafer et al. | 356/247 |
| 2006/0044546 A1 | * | 3/2006 | Lewin et al. | 356/4.04 |
| 2006/0274545 A1 | * | 12/2006 | Rosenstein et al. | 362/512 |

* cited by examiner

*Primary Examiner*—Thomas H. Tarcza
*Assistant Examiner*—Timothy A Brainard
(74) *Attorney, Agent, or Firm*—Michael Diaz

(57) ABSTRACT

The present invention is a system and method of acquiring airborne objects utilizing a reverse logic algorithm. The system includes an optics component for detecting the intensity of light from a light source as well as determining the location of the light source. In addition, the system includes a computing system to determine sources of light, which fall below a specified light intensity threshold. The portion of the sky where the light intensity falls below the threshold is determined to be airborne objects. The airborne objects can be tracked by velocity and direction as desired by the acquisition system.

18 Claims, 8 Drawing Sheets

To FIG. 4B

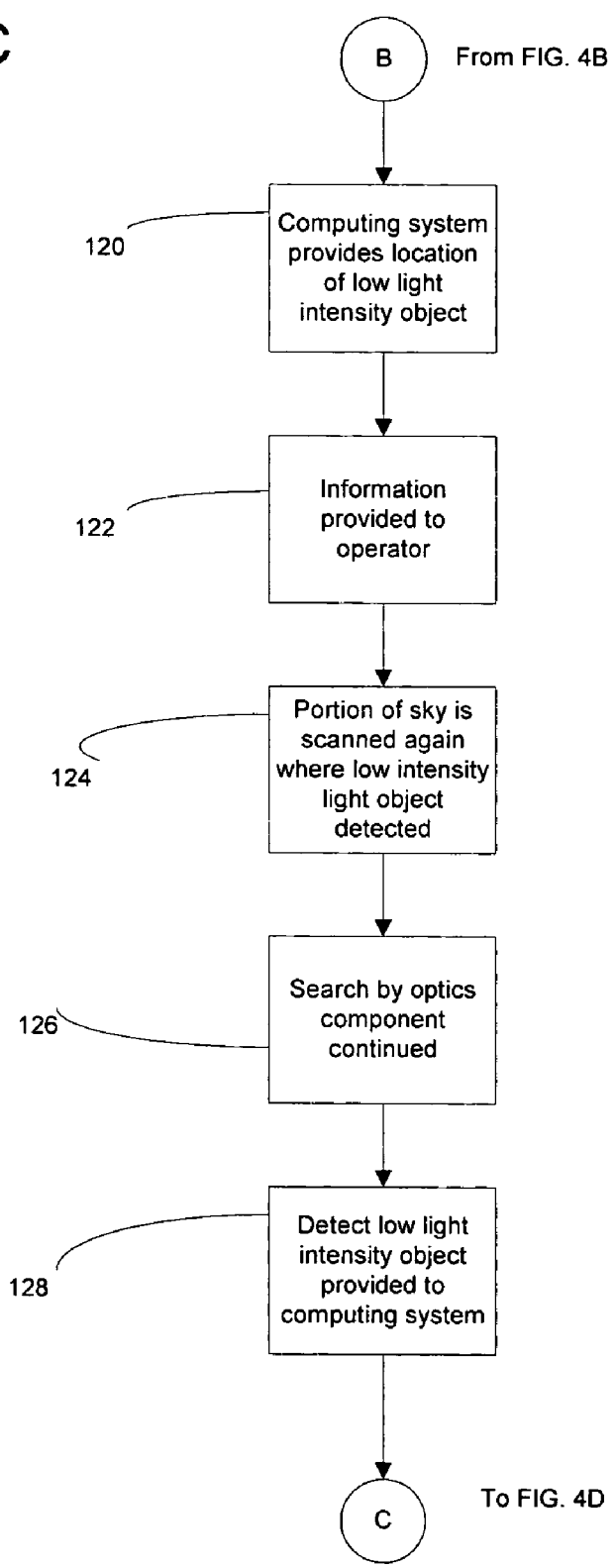

REVERSE LOGIC OPTICAL ACQUISITION SYSTEM AND METHOD

BACKGROUND OF THE INVENTION

1. Field of the Invention

This invention relates to acquisition systems. Specifically, the present invention relates to an optical acquisition system utilizing a reverse logic algorithm.

2. Description of the Related Art

Systems and methods for acquiring aircraft, both manned and unmanned, have progressed tremendous over the last century. In times throughout the past century, various types of optical systems have been used to visually acquire aircraft, such as infrared detection and optical magnification systems. However airborne threats, such as aircraft and missiles, have utilized increasingly sophisticated technology. These modern aircraft have become increasingly more difficult to acquire visually because of the speed upon ingress to a selected target of the aircraft, height above ground (both high and low) that the aircraft fly, the effective use of camouflage on the aircraft, and the ability to effectively fly and employ weapons at night. To counter the difficulty in visually acquiring these aircraft, radar acquisition systems are now effectively employed. However, with the introduction of stealth technology on aircraft, radar acquisition systems alone are not enough to effectively detect airborne threats. Existing target acquisition radar cannot detect airborne threats utilizing this stealth technology.

State of the art stealth technology allows aircraft to effectively become invisible to radar. Most conventional aircraft have a rounded shape. This shape is efficient in terms of aerodynamics but also creates a very efficient radar reflector. The round shape means that no matter where the radar signal hits the aircraft, some of the transmitted radar signal is reflected back to the radar antenna. On the other hand, a stealth aircraft is made up of completely flat surfaces at very sharp edges. When a radar signal hits a stealth aircraft, the signal reflects away at an angle, away from the radar antenna. In addition, surfaces on a stealth aircraft can be treated so they absorb radar energy. The overall result is that a stealth aircraft such as U.S. Air Force's F-117 can have a radar signature of a small bird rather than an aircraft. Thus, use of radar only to effectively detect airborne objects has become increasingly difficult and unreliable.

However, as stated above, the use of optical systems have some severe disadvantages. Existing aircraft often fly at night or use effective camouflage to hide from visual detection. Existing optical systems can use a variety of technology to increase the optical detection capabilities. Yet even with the strongest magnification, many aircraft go undetected. A system and method are needed which provides an effective and efficient way of detecting aircraft, whether in the day or at night.

Thus, it would be a distinct advantage to have a reverse logic optical system and method to detect the presence of airborne targets. It is an object of the present invention to provide such a system and method.

SUMMARY OF THE INVENTION

In one aspect, the present invention is an airborne acquisition system for detecting an airborne object. The system includes an optics component for scanning a portion of sky. The optics component is capable of detecting a plurality of light sources and measuring the intensity of light sources. The system also includes a computing system for determining a location and light intensity of each light source from information received from the optics component. The computing system determines the presence of the airborne object when a light source has a light intensity below a specified threshold limit of light intensity. The computing system may distinguish ambient light sources from other light sources. In addition, the computing system may determine the threshold limit by accounting for the current time of year, current time of day, and current weather within the vicinity of the airborne acquisition system. The computing system may also determine the movement of the airborne object by receiving continuous information on the light sources from the optics component.

In another aspect, the present invention is a method of detecting an airborne object. The method begins by providing an optics component for scanning the sky for light sources. A threshold limit of low light intensity for which light intensity by light sources below the threshold limit are indicative of an airborne object is then determined. A portion of the sky is scanned by the optics component for light sources. The optics component is capable of measuring the location and intensity of each detected light source. The presence of an airborne object is determined by determining each light source having a light intensity below the determined threshold limit.

In still another aspect, the present invention is a reverse logic algorithm for detecting an airborne object. The algorithm determines a threshold limit of low light intensity. Any light source falling below the threshold limit is indicative of an airborne object. Ambient light sources are distinguished from airborne light sources by determining each light source having a light intensity below the threshold limit. The airborne object is detected when a light source has a light intensity below the threshold limit.

BRIEF DESCRIPTION OF THE DRAWINGS

FIGS. 4A-D are flow charts outlining the steps for acquiring an airborne target utilizing reverse logic according to the teachings of the present invention.

DESCRIPTION OF THE INVENTION

Figure 1:
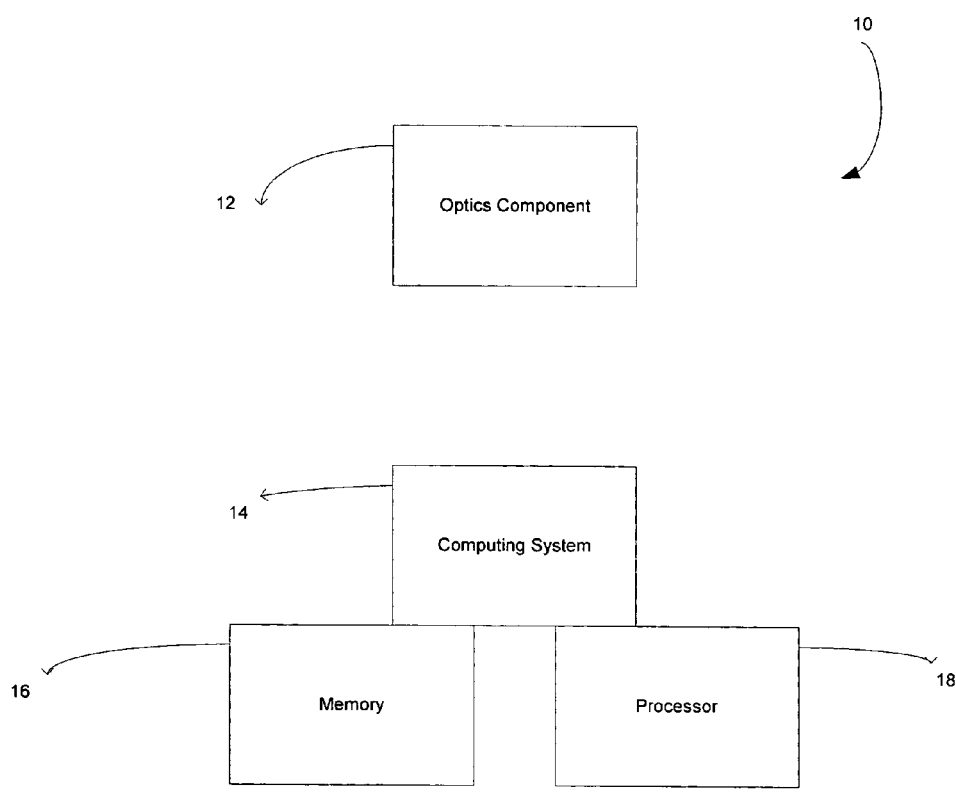
FIG. 1 is a simplified block diagram of the components of the acquisition system in the preferred embodiment of the present invention.

A reverse logic optical acquisition system and method is disclosed. FIG. 1 is a simplified block diagram of the components of the acquisition system 10 in the preferred embodiment of the present invention. The acquisition system includes an optics component 12 and a computing system 14. The optics component is an optical acquisition device which scans an area in the sky in search of light sources. The optics component determines the location of detected light sources. The optics component may be any device able to detect light sources in any spectrum of the light (e.g., infrared range, visible range etc.), such as optical magnifiers and infrared detectors. In the preferred embodiment of the present invention, the optics component may measure the intensity of light sources in the sky as well as determine the location of the light sources. Specifically, the optics component may utilize night vision technology, which relies on light amplification to augment images.

The computing system 14 may be any computer providing a memory 16 and a processor 18. The computing system 14 receives data from the optics component 12 to include location and intensity of light sources. The computing system stores the information within the memory 16. In addition, the computing system may determine an average intensity of the light sources to include any ambient or background light sources, such as from starlight or sunlight. The computing system, through the processor 18, determines when a specific location of the sky has a lower light intensity than a threshold level of light intensity, within a specified deviation. The lower light intensity may be indicative of an object flying in a portion of the sky which blocks any ambient or background light sources, such as from starlight, reflected ground-source illumination, or sunlight. The computing system may track the lower than normal light source. If the lower than normal light source moves across the sky, a target may be indicated and provided to the acquisition system operator.

Figure 2A:
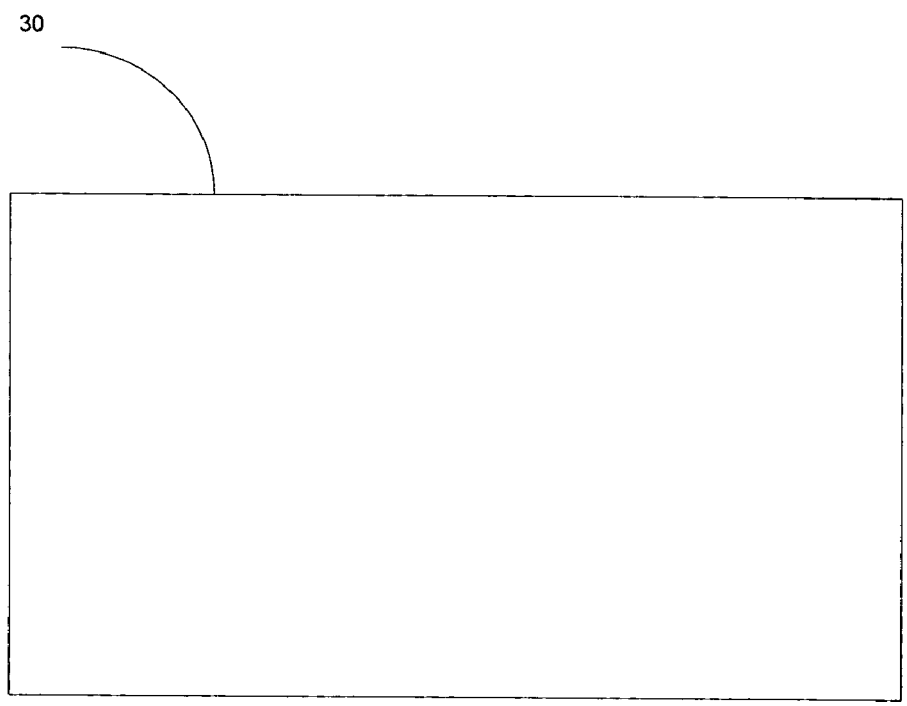
FIGS. 2A and 2B are graphical illustrations of an exemplary optical search result in the preferred embodiment of the present invention.
Figure 2B:
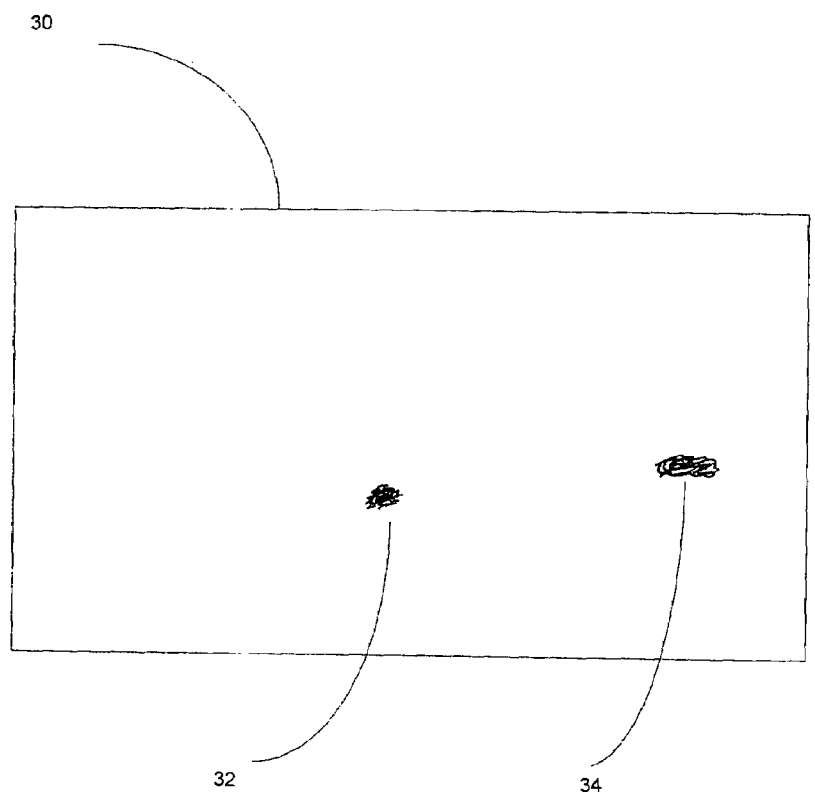

FIGS. 2A and 2B are graphical illustrations of an exemplary optical search result in the preferred embodiment of the present invention. In FIG. 2A, a portion of the sky 30 is observed by the optics component 12. As illustrated in FIG. 2A, there are no hidden airborne objects. Sky 30 shows a relatively constant level of light intensity throughout the portion of observed sky. In FIG. 2B, two dark objects 32 and 34 are shown in front of the sky 30. The objects may be hidden from radar, however since the objects have a mass and size that cannot be hidden, the objects shield the background or ambient light from being observed by the optics component. An example of this blocking characteristic may me shown with clouds. Without the presence of clouds, the sunshine reaches the ground. However, when clouds block the sun, some or all of the sunlight is blocked. In a similar manner, an aircraft blocks the light sources (e.g., starlight, reflected ground-source illumination or sunlight) from being detected fully.

Figure 3:
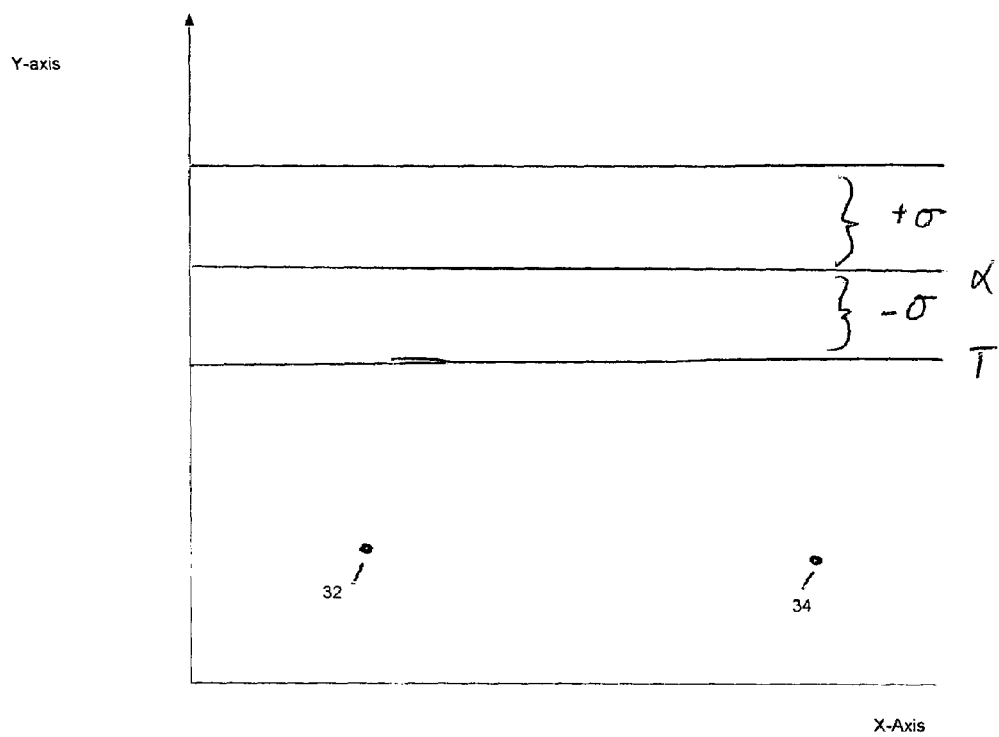
FIG. 3 is a exemplary graph illustrating light intensity in a portion of the sky.
Figure 4A:
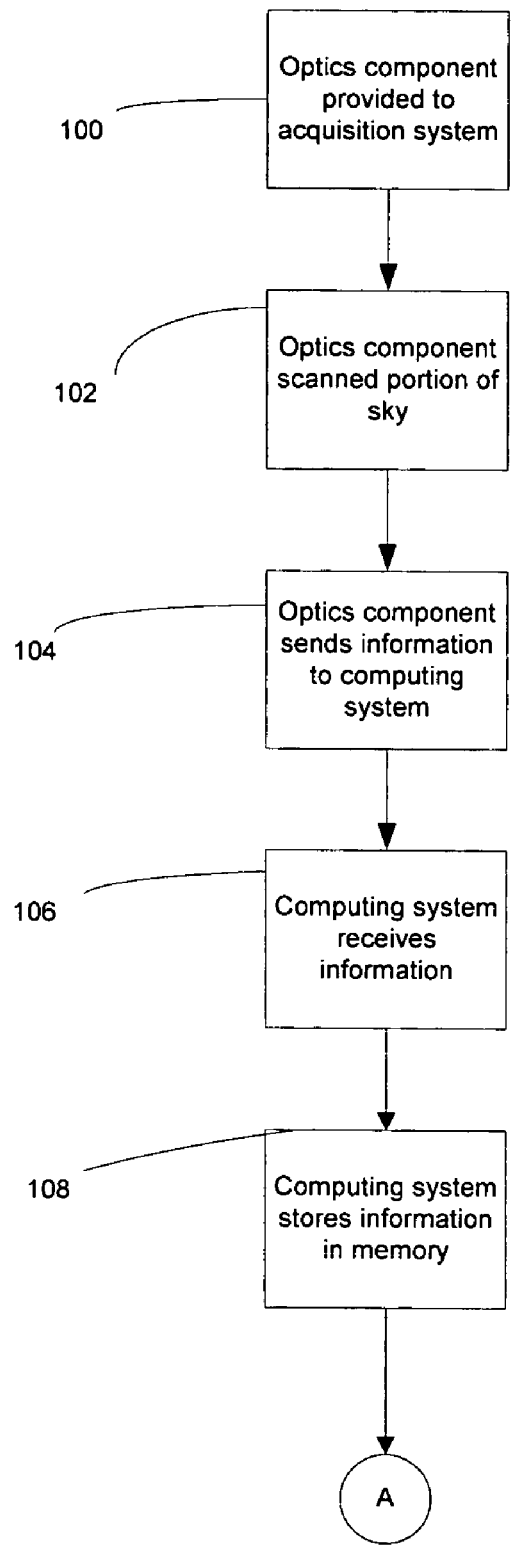
Figure 4B:
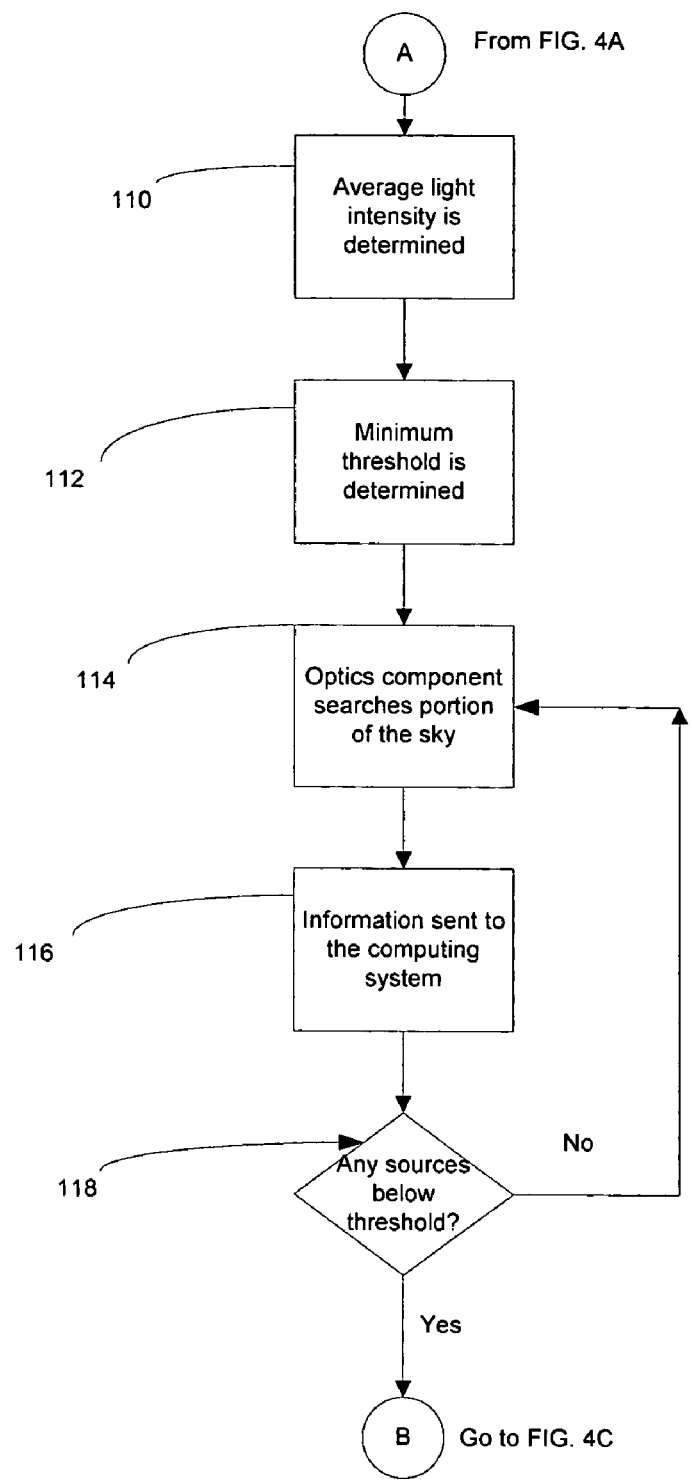
Figure 4D:
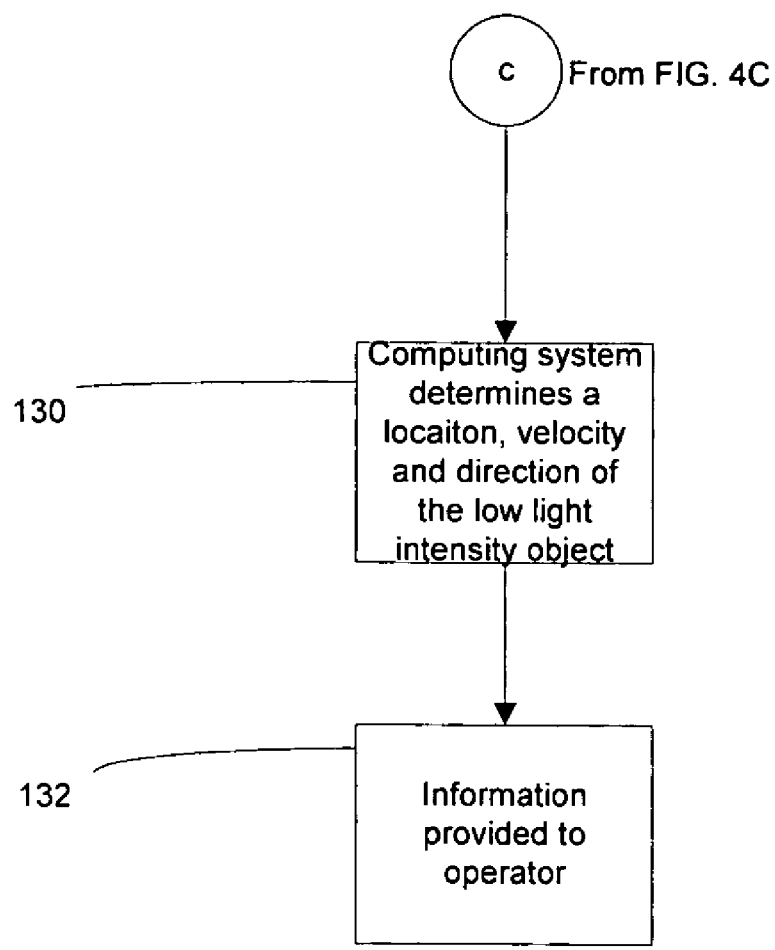

FIG. 3 is an exemplary graph illustrating light intensity in a portion of the sky. The X-axis may measure the azimuth or distance from the optics component while the Y-axis represents the intensity of light of the selected portion of the sky. An average light intensity $\alpha$ is show for the selected portion of sky. Standard deviations $+\sigma$ and $-\sigma$ are calculated by the computing system 14. The $-\sigma$ provides a threshold T for determining the presence of an airborne object. When the detected light intensity falls below the threshold, an airborne object is indicated.

With reference to FIGS. 1, 2A, 2B, and 3, the operation of the acquisition system will now be explained. The acquisition system preferably divides the sky into designated sectors. The optics component searches a specified sector of the sky for light sources. Information relating to the total light sources over a sector of sky is sent to the computing system 14. The computing system determines an average light intensity for a specific area of sky searched. In addition, the computing system, through historical data and other external information taking into account weather, time of day or night, and time of the year, calculates the average light intensity and a threshold T. If a light source's light intensity falls below the threshold T, an airborne object may be, blocking background or ambient light from being detected by the optics component. This threshold T may be determined from previous gathered data or information provided to the computing system for use in determining the threshold.

Once given the average light intensity and threshold T, the optics component begins searching the sky in the specified sector for areas where the light intensity in a specific area of sky is below the specified threshold. The areas having low light intensity below the specified threshold are tracked by storing the location in the sky within the computing system. The areas and their vicinity of probable airborne objects may be monitored for further movement. As discussed above, the light of a light source or the detection of below normal light intensity of a specified sector of sky is indicative of an airborne target. Therefore, the computing system, through the optics component utilizes a reverse logic to find the airborne targets. Specifically, rather than trying to find light sources to indicate a flying object, the acquisition system finds areas of the sky where the detected light is below the specified threshold. This low light intensity indicates an airborne object which blocks out ambient or background light.

The computing system may optionally track the low light intensity source for further detailed scrutiny. The movement of the low light intensity source may be used in the computing system logic to determine the presence of an airborne object. The movement may also provide a further indication of a man-made airborne object. Furthermore, the computing system 14 may be used to determine the velocity and direction the airborne object is traveling.

The computing system may utilize the information gathered from the optics component to determine those areas having a low light intensity. Further scrutiny of these low light intensity areas by either optical or other non-optical detections means may be used to determine the location of airborne objects. However, as stated above, the present invention utilizes the reserve logic of finding sources of low light intensity rather than attempting to optically track the airborne target directly.

FIGS. 4A, 4B, 4C, 4D are flow charts outlining the steps for acquiring an airborne target utilizing reverse logic according to the teachings of the present invention. With reference to FIGS. 1, 2A, 2B, 3, 4A, 4B, 4C, and 4D the steps of the method will now be explained. The method begins with step 100 where the optics component 12 is provided to the acquisition system 10. The optics component includes a capability to determine the light intensity of the specified portion of the sky. The optics component may also be capable of determining the location in the sky of the light sources. Next, in step 102, the optics component 12 searches a specified portion of the sky to provide a calibration for the acquisition system 10. The optics component measures the light intensity, in any spectrum of the light. In step 104, the optics component sends the received information (e.g., light intensity over a specified sector of sky) to the computing system 14. Although a portion of the sky is preferably designated, the optics component may scan the entire sky.

The method then moves to step 106 where the computing system 14 receives the information from the optics component 12. Next, in step 108, the computing system stores the information within the memory 16. In step 110, the computing system 14, through the processor 18, determines an average light intensity $\alpha$ for the specified section of the sky. This average may include historical data and may include other information, such as time of day, weather conditions, time of year, etc. With the determined average, the method moves to step 112 where the computing system determines a minimum threshold T, from which deviation from the average is beyond the norm. Thus, although there may be slight deviation from the average light intensity, a probable airborne object is not detected until the threshold is crossed. The use of a threshold T rather than the average light intensity allows for natural anomalies in the detection of light sources. This calibration may continuously take place or be completed at selected time intervals.

Next, after calibrating the optics component 12, the method moves to step 114, where the optics component 12 searches a specified portion of the sky. In step 116, the information obtained from the search of the sky by the optics component is sent to the computing system 118. In step 118, it is determined if there are any locations from the search results obtained from the optics component having an intensity of light below the determined threshold T. If it is determined that there are no locations in the sky having a light intensity below the threshold, the method moves to step 114 where the optics component continues to search the sky.

However, if it is determined that there are locations in the sky having a lower light intensity than the threshold, the method moves from step 118 to step 120 where the computing system provides a location from the received information obtained from the search of the lower intensity light source. Next, in step 122, this information is provided to an operator of the acquisition system, providing target intensity, size of the target, and location.

In step 124, the acquisition system, through the computing system 14, may direct closer scrutiny of the portion of the sky showing the low light intensity objects. These low intensity objects may have moved during the search. Through an iterative search process, this movement may be detected by the optics component. Previous locations of the low intensity objects are compared with present position of the low intensity objects to derive a velocity and direction of the airborne object. Therefore, in step 126, the optics component continues to search a selected portion of the sky. Any low intensity light sources are again provided to the computing system 14 in step 128. In step 130, the computing system provides a location, light intensity level, velocity and direction of the moving target. Next, in step 132, the moving target information is provided to the operator of the acquisition system 10.

The present invention utilizes a reverse logic to determine the location, speed and direction of airborne objects. The use of this information may be provided to the operator. Further searching scans may determine more information, such as the speed and direction of the airborne targets. In the preferred embodiment of the present invention, the searches by the optics component are iterative and may cover all sectors of the sky. However, alternatively, the acquisition system may observe specified sectors of the sky for which entry into is more probable, thus preventing valuable resources from searching of the entire sky.

The present invention provides many advantages over the existing systems and methods of optically acquiring the airborne objects. The present invention provides an effective method of detecting and tracking airborne targets, whether in the daytime or nighttime. In addition, because radar is not employed with the present invention, the acquisition system provides a capability of tracking stealth technology-based aircraft. The present invention may utilize any optics systems through any spectrum of light to find an airborne target.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An airborne acquisition system for detecting an airborne object, said system comprising:
    an optics component for scanning a portion of sky, said optics component capable of detecting a plurality of light sources and measuring the intensity of light of the plurality of light sources; and
    a computing system for determining a location and light intensity of each light source from information received from said optics component;
    means for determining when a specific location of the sky has a lower light intensity than a threshold level of light intensity;
    whereby said computing system determines the presence of the airborne object when a light source has a light intensity below the specified threshold limit of light intensity.

2. The airborne acquisition system for detecting an airborne object of claim 1 wherein the threshold limit includes determining an ambient light present in the sky.

3. The airborne acquisition system for detecting an airborne object of claim 2 wherein said computing system determines the threshold limit by determining the ambient light present at a specified time of day.

4. The airborne acquisition system for detecting an airborne object of claim 2 wherein said computing system determines the threshold limit by determining the ambient light present by accounting for the current weather within the vicinity of the airborne acquisition system.

5. The airborne acquisition system for detecting an airborne object of claim 2 wherein said computing system determines the threshold limit by determining the ambient light present and accounting for the current time of year.

6. The airborne acquisition system for detecting an airborne object of claim 2 wherein said computing system determines the threshold limit by determining the ambient light present by accounting for the current time of year, current time of day, and current weather within the vicinity of the airborne acquisition system.

7. The airborne acquisition system for detecting an airborne object of claim 1 wherein said computing system distinguishes any background or ambient light sources from other light sources for determining the presence of the airborne object.

8. The airborne acquisition system for detecting an airborne object of claim 1 wherein said computing system determines the movement of the airborne object by receiving continuous information on the light sources from said optics component.

9. The airborne acquisition system for detecting an airborne object of claim 8 wherein said computing system determines the velocity and direction of the airborne object from information received from said optics component.

10. The airborne acquisition system for detecting an airborne object of claim 1 wherein said optics component includes the capability to measure light in the infrared range of the light spectrum.

11. The airborne acquisition system for detecting an airborne object of claim 1 wherein said optics component includes the capability to measure light in the visible range of the light spectrum.

12. The airborne acquisition system for detecting an airborne object of claim 1 wherein:

wherein the threshold limit includes determining an ambient light present;
said computing system determines the threshold limit by determining the ambient light present by accounting for the current time of year, current time of day, and current weather within the vicinity of the airborne acquisition system;
said computing system distinguishes any background or ambient light sources from other light sources for determining the presence of the airborne object; and
said computing system determines the movement of the airborne object by receiving continuous information on the light sources from said optics component.

13. A method of detecting an airborne object, the method comprising the steps of:
providing an optics component for scanning the sky for light sources;
determining a threshold limit of low light intensity for which light intensity by light sources below the threshold limit are indicative of an airborne object;
scanning a portion of the sky by the optics component for light sources, the optics component capable of measuring the location and intensity of each detected light source; and
determining a presence of an airborne object by determining each light source having a light intensity below the determined threshold limit.

14. The method of detecting an airborne object of claim 13 wherein the step of determining a threshold limit of low light intensity includes determining any ambient light present.

15. The method of detecting an airborne object of claim 14 wherein the threshold limit includes accounting for the ambient light present at a specified time of day.

16. The method of detecting an airborne object of claim 14 wherein the threshold limit includes accounting for the ambient light present for a specific weather condition.

17. The method of detecting an airborne object of claim 13 wherein a computing system distinguish any background or ambient light sources from other light sources for determining the presence of the airborne object.

18. The method of detecting an airborne object of claim 13 wherein the step of determining a presence of an airborne object includes determining the movement of the airborne object by receiving continuous information on the light sources from the optics component.

* * * * *